Aug. 29, 1961

C. W. HANKS ET AL 2,997,760

CONTINUOUS VACUUM CASTING PROCESS

Filed June 10, 1957

CHARLES W. HANKS
CHARLES d'A. HUNT
HUGH R. SMITH, JR.
INVENTORS

BY Lippincott, Smith & Ralls

ATTORNEYS

United States Patent Office 2,997,760
Patented Aug. 29, 1961

2,997,760
CONTINUOUS VACUUM CASTING PROCESS
Charles W. Hanks and Charles d'A. Hunt, Orinda, and Hugh R. Smith, Jr., Berkeley, Calif., assignors to Stauffer Chemical Company, New York, N.Y., a corporation of Delaware
Filed June 10, 1957, Ser. No. 664,609
4 Claims. (Cl. 22—200.1)

This invention relates to the melting and casting of metals in vacuo to remove co-mixed or dissolved volatile matter, and in particular to an improved vacuum devolatilizing and casting process operable on a substantially continuous basis for producing castings of devolatilized metal at lower cost than has been possible heretofore. The present patent application is a continuation-in-part of our copending application entitled "Vacuum Melting and Casting Apparatus," Serial No. 603,508, filed August 13, 1956, now abandoned.

Metals that have been melted at atmospheric pressure invariably contain dissolved gases and other volatile matter (such as sulphur) to some degree, and metal in sponge form from chemical processing operations frequently contains admixed volatile matter such as chlorides and their associated water of hydration, as well as dissolved hydrogen. As herein used, the term "volatile matter" refers to all impurities in the metal that are volatilized, or form volatile compounds with other substances present, or decompose into volatile constituents when separated from the metal at temperatures near the melting point of the metal. It is well known that elimination of such volatile matter from metals in order to produce sound ingots, with no porosity and a low content of impurities resulting from the presence of such volatile substances, is a desirable objective for many metal working applications.

Vacuum melting and casting accomplishes this elimination of volatile matter to a degree that depends largely upon the absolute pressure reached in the vacuum tank. Thus, an increased degree of devolatilization occurs in a molten metal as the pressure on the metal is reduced, until a practical limit is reached at absolute pressures in the order of one-half micron of mercury or less. At these pressures substantially complete devolatilization of the molten metal occurs almost immediately, and reactions such as carbon de-oxidation of copper and iron occur practically instantaneously at the surface of the molten material. Consequently, ingots and other castings of metal that has been melted and cast in a high vacuum are substantially non-porous and contain very little volatile matter. As herein used, the term "high vacuum" refers to absolute pressures smaller than about one micron of mercury, at which substantially complete devolatilization of the molten metal occurs.

In the high vacuum required for substantially complete devolatilization of a metal, the amount of volatile matter evolved during the melting of any appreciable quantity of metal previously processed at atmospheric pressure forms such a large volume of gas that continuous maintenance of the high vacuum with practical pump configurations has not been feasible. Consequently, the conventional way to cast metals under high vacuum conditions has been to operate batchwise, with relatively high pressures (1000 microns of mercury absolute pressure, for example) at the onset of melting. As the gas evolution proceeds and gradually diminishes, while the vacuum pump operates continuously, the pressure in the vacuum system gradually drops and finally, after the system has been at a pressure less than one-half micron of mercury for several minutes, devolatilization of the molten metal is essentially complete and the casting operation is performed.

Although the conventional batchwise method for casting metal under high-vacuum conditions produces castings of high quality, the process is relatively slow and the cost of the castings is high. In particular, batchwise pumping with absolute pressures in the vacuum tank varying by a factor of 1000 or more prevents economical utilization of the vacuum pumps.

Various attempts have been made previously to increase the speed and to reduce the cost of vacuum casting operations. However, to the best of applicants' knowledge, no vacuum casting process or apparatus prior to the present invention has solved all of the following problems: continuous or semi-continuous operation for relatively economical and large-scale production of devolatilized castings; elimination of batchwise pumping and accompanying vacuum pump inefficiencies; casting in sufficiently high vacuum for substantially complete devolatilization of the metal; production of sound castings with virtually no cavities or fissures; handling commercial-grade metal initially containing substantial quantities of volatile matter (e.g., more than about 0.1 percent by weight); and providing reasonably efficient means for heating and melting the metal.

Accordingly, an object of this invention is to provide an improved vacuum melting and casting process that solves the aforesaid problems and achieves the aforesaid and other advantages; and in particular to provide improved and practical means for producing highly devolatilized castings on a substantially continuous basis at lower cost than has been possible heretofore; to eliminate batchwise pumping cycles and to maintain a continuous high vacuum for the casting operation; to make possible the use of electronic heating techniques that can be used only in high vacuum; and to avoid electrical instability and arcing that have heretofore hindered the use of such techniques in vacuum casting operations.

Certain metals, such as titanium, are so active chemically when they are molten that it is hard to provide any container for holding them while in the molten state. Accordingly, another object of this invention is to provide improved means for the vacuum melting and casting of chemically active metals such as titanium.

Briefly stated, in accordance with certain of its aspects, this invention makes practicable a continuous, economical, large-scale process for devolatilizing and casting metals in vacuo, consisting of several contemporaneous operations on a continual flow of material.

Molten metal, initially containing substantial amounts of volatile matter, is continually supplied in contact with a continuously maintained rough vacuum, so that the metal continually evolves a portion of its volatile matter into the rough vacuum to produce a continual supply of partly devolatilized molten metal. As herein used, the term "rough vacuum" refers to absolute pressures between approximately ten microns of mercury and approximately one millimeter of mercury. Within this range of pressures, a metal previously processed at atmospheric pressure will, when molten, evolve a major portion of the volatile matter that it contained initially; and the volatile matter so evolved will occupy only a small fraction of the volume that the same volatile matter would occupy in the much higher vacuum required for complete devolatilization of the metal. Consequently, a conventional vacuum pump designed for operation at rough-vacuum pressures can, with relative ease and good pumping efficiency, maintain the rough vacuum continuously while removing a major portion of the evolved volatile matter from the vacuum system. In this stage of the process, an absolute pressure substantially lower than ten microns of mercury would prevent efficient pumping of the volatile matter out of the vacuum system, not only because of the greater difficulty in maintaining a higher vacuum, but also because of the increase in volume of a gas as its pressure is lowered. An absolute pressure substantially higher than one millimeter of mercury would leave too much volatile matter in the metal for efficient operation of the next stage of the process.

The partly devolatilized molten metal is continually transferred into contact with a continuously maintained high vacuum, at an absolute pressure smaller than one micron of mercury, so that the metal continually evolves a remaining portion of the volatile matter into the high vacuum to produce a continual supply of highly devolatilized molten metal. Because a major portion of the volatile matter is evolved into the rough vacuum before the metal is transferred into contact with the high vacuum, continuous maintenance of the high vacuum, while removing the volatile matter continually evolved into it, can be accomplished readily and economically with available high-vacuum pumps.

The highly devolatilized metal may be vacuum cast in the same high vacuum that was used in producing it. The castings so made are of high quality, are non-porous, and contain very little, if any, volatile matter.

The new process can be carried out most effectively within a partitioned vacuum tank defining upper and lower vacuum chambers. A rough vacuum is continuously maintained in the upper vacuum chamber by an oil jet pump or the like, and a high vacuum is continuously maintained in the lower vacuum chamber by an oil diffusion pump or other suitable high-vacuum pump. Since each pump operates under substantially constant conditions, and seldom operates outside the pressure range for which it is best suited, both pumps can be designed for exceptionally efficient and economical pumping. In cases where a substantial part of the volatile matter is condensable at ambient temperatures, condensers may be used to reduce the volume of matter that must be removed by the pumps.

The metal can advantageously be melted in a small crucible fitted into and forming a part of the partition separating the upper and lower vacuum chambers. The top of the crucible opens into the upper vacuum chamber, so that a rough vacuum is continuously maintained within the crucible. Metal is continually fed into the crucible and heated to its melting temperature, to provide a continual supply of molten metal in contact with the rough vacuum. The molten metal continually evolves volatile matter into the rough vacuum to produce a continual supply of partly devolatilized metal. The partly devolatilized metal continually flows through an aperture in the bottom of the crucible into the lower vacuum chamber, where devolatilization is completed by the continual evolution of volatile matter into the high vacuum. The crucible can be heated by any convenient means to heat the metal therein. Since the bottom of the crucible may extend into the lower or high-vacuum chamber, electron bombardment of the crucible can be used advantageously for heating purposes, without difficulties due to electrical instability and arcing that are encountered at higher pressures.

In the case of titanium and other chemically active metals the use of a crucible to contain the metal in the upper chamber is made practical by the fact that the metal can flow out of the crucible almost as soon as it melts, so that molten metal is in contact with the crucible for a very short time, and by the fact that the size of the crucible can be very small compared to the quantity of material handled over a period of time, so that the use of expensive chemically-resistant crucibles is economically feasible.

The metal flowing out of the bottom of the crucible may be received by an open-topped mold suitably positioned in the lower or high-vacuum chamber. For example, an annular, water-cooled mold may be used to cast continuous billets or rods, which may be continually withdrawn from the bottom of the mold. This method of casting is particularly desirable in the case of chemically active metals such as titanium, because the molten metal flowing out of the crucible can be caught and held in a "skull" formed at the top of the solidified cast rod of the same metal. Thus, chemical action on the mold and consequent contamination of the cast metal are substatially avoided. With less active metals such as steel, the metal flowing out of the crucible may be caught and held initially in a ladle or other vessel, and subsequently transferred, under high vacuum, to molds of any desired type and shape.

To insure a sound casting, particularly in the casting of continuous rods with a water-cooled annular mold, additional heat must be supplied continually to a pool of molten metal held in the "skull" at the top of the cast rod. This presents a rpoblem because heat must be supplied directly to the pool of molten metal and not directly to the water-cooled mold. Thus, resistance heating, induction heating, and the like are not feasible. The problem is solved by using high-voltage electron bombardment to heat the pool of molten metal. The use of electron bombardment is made possible by the continuous mainteance of a high vacuum in the lower vacuum chamber. The high vacuum permits the existence of a space-charge limited electronic current, without electrical instability or arcing.

The invention may be better understood from the following illustrative description and the accompanying drawings. The scope of the invention is defined by the appended claims.

Figure 1:
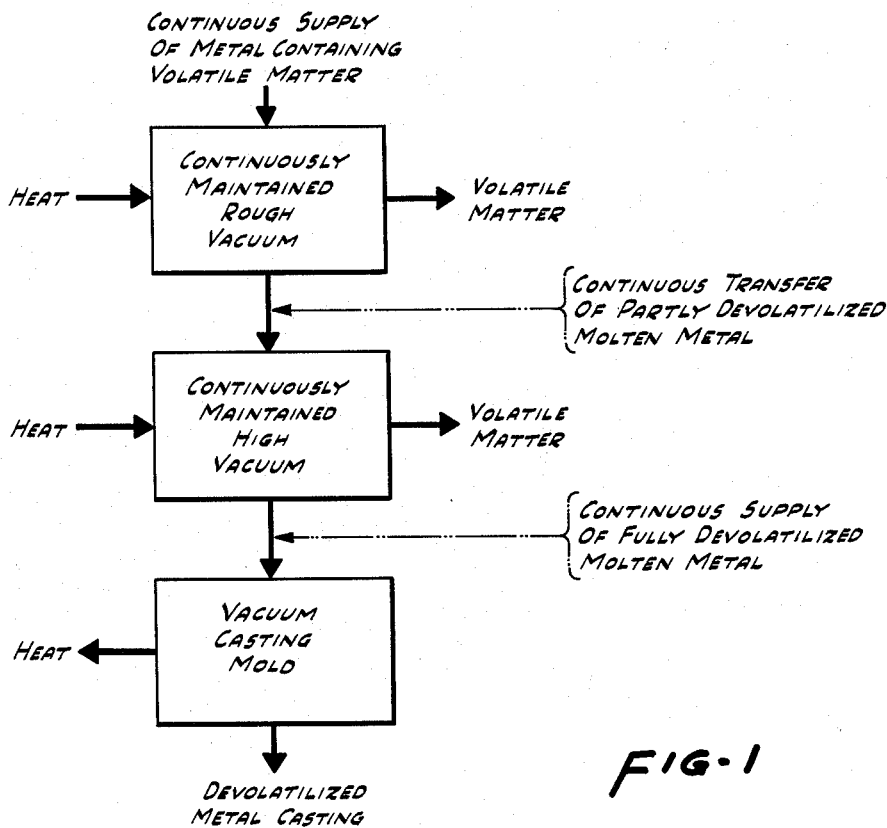
FIG. 1 is a simplified flow diagram illustrating certain aspects of this invention.

The simplified flow diagram illustrated in FIG. 1 of the drawings is self-explanatory. It will be noted that the flow diagram describes, in general terms, a substantially continuous process for making devolatilized castings. There is a continual flow of material whereby molten metal is brought into contact, sequentially, with a continuously maintained rough vacuum and a continuously maintained high vacuum. Preferably, heat is applied to the metal in both vacuum stages to keep the metal in a molten state, and the volatile matter evolved by the metal is continuously pumped out of both vacuums. Finally, the devolatilized metal is vacuum cast in a mold, from which heat is extracted.

To facilitate a better understanding of the invention and certain further aspects thereof, it will now be described in conjunction with apparatus that may be used in practicing the invention. It should be understood that the invention is not limited to any specific form or construction of such apparatus, except to the extent that the form of the apparaus is dictated by the requirements of process, and that numerous variations are possible in the form and structure of the apparatus employed.

Figure 2:
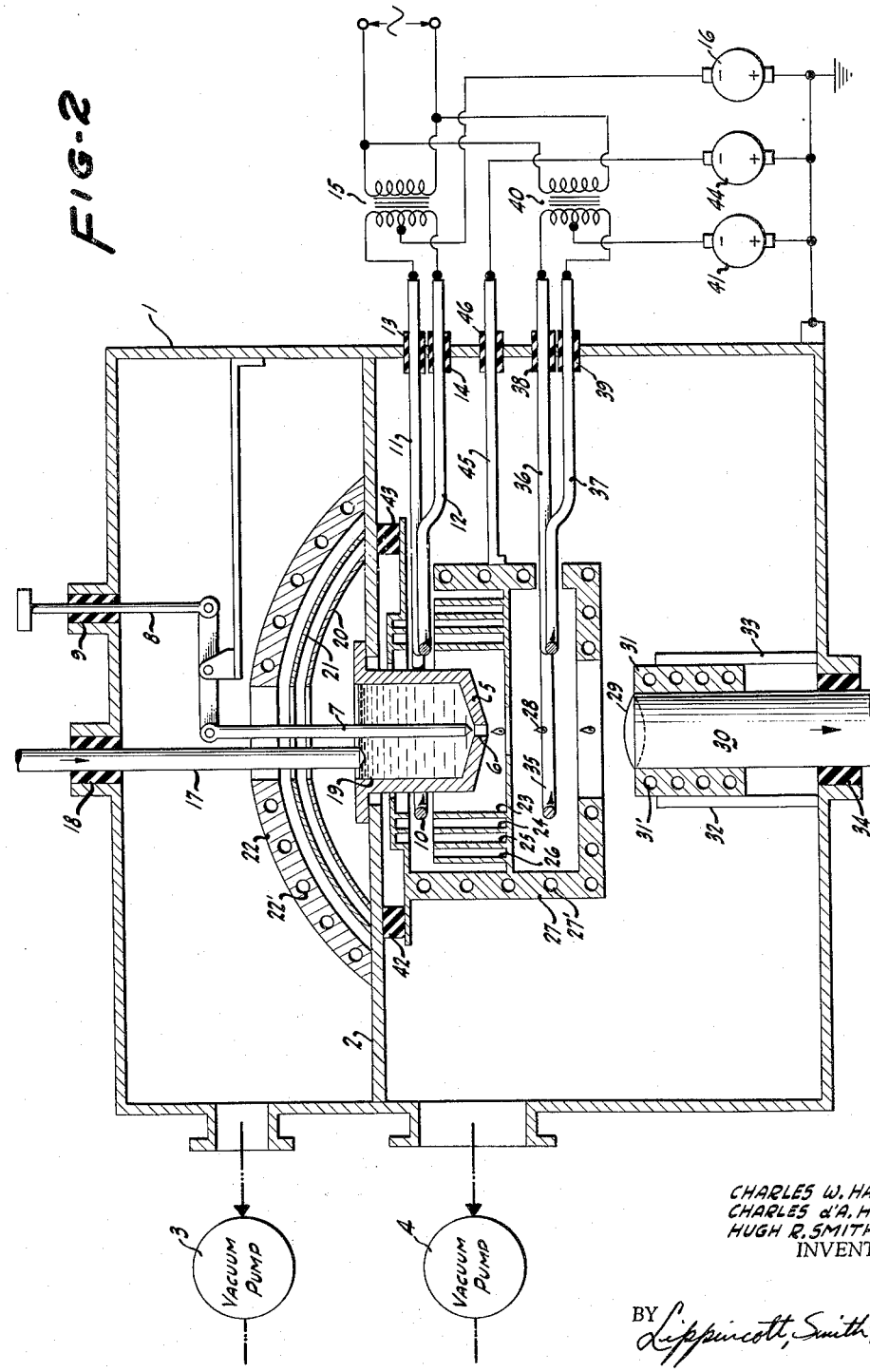
FIG. 2 is a largely schematic vertical section of apparatus that may be used in practicing this invention.

Referring to FIG. 2 of the drawings, a vacuum system enclosure 1 and a horizontal partition 2 therein define adjacent upper and lower vacuum chambers. A rough vacuum, at an absolute pressure between ten microns of mercury and one millimeter of mercury, is continuously maintained in the upper chamber by a vacuum pump 3. A high vacuum, at an absolute pressure less than one micron of mercury, is continuously maintained in the lower chamber by a vacuum pump 4. Each of the two vacuum pumps is designed for best operation under its particular conditions. For example, pump 3 may advantageously be an oil jet pump which operates best in the range of suction pressures between about ten and three hundred microns of mercury, absolute. Pump 4 may be an oil diffusion pump (commercially available at present in sizes up to forty-eight inches diameter) designed for high-vacuum operation to maintain an absolute pressure of about one-half micron of mercury, or less.

An open-topped crucible 5 is supported by and extends downward through partition 2, as shown, so that the interior of the crucible communicates with and is a part of the upper or rough-vacuum chamber while the lower outside portion of the crucible extends into the lower or high-vacuum chamber. Thus, in effect, crucible 5 is a part of the partition between the two vacuum chambers. Partition 2 and crucible 5 together separate and form a vacuum seal between the rough-vacuum chamber and the high-vacuum chamber. The bottom of the crucible contains a small aperture 6 (e.g., a one-eighth inch diameter hole in a one and one-half inch inside diameter crucible) through which molten metal may flow from the rough-vacuum chamber into the high-vacuum chamber. A plug 7, operable to close aperture 6 by movement of an operating rod 8 extending out of the vacuum system through a vacuum seal 9, may be provided to control the flow of metal out of the crucible. During operation, plug 7 is raised sufficiently to permit a continual flow of molten metal through aperture 6.

The crucible may be made of any suitable refractory material that can withstand high temperatures and is chemically resistant to the metal being melted. For example, in the vacuum melting and casting of iron or steel or the like, crucible 5 may be made of graphite lined inside with suitable refractory material. Various means may be employed for heating and melting the metal within the crucible, such as induction heating or electrical resistance heating, but preferably the crucible is heated by electron bombardment. For this purpose the crucible is made of an electrically conductive material, or is coated with an electrically conductive material, and is electrically connected to ground through metal parts of the vacuum system enclosure or by any other means.

A substantially annular electron-emitting cathode 10 extends around crucible 5. The cathode may, for example, be a loop of tungsten wire having its ends connected to and supported by a pair of leads 11 and 12 that extend through insulators 13 and 14 through a side wall of vacuum enclosure 1, as shown. Leads 11 and 12 may be connected to the secondary of a transformer 15 having a primary connected to any convenient source of alternating current for providing a current through loop 10 to heat the same and to produce thermionic emission of electrons at the cathode. The cathode 10 is maintained at a negative potential relative to crucible 5 by any suitable means, such as an electric generator 16 connected to a center tap on the secondary of transformer 15, as shown. Consequently, the crucible is the anode of a high-vacuum diode, and electrons emitted by cathode 10 are accelerated to high velocities and bombard crucible 5 to heat the crucible and to melt metal contained in the crucible. Since the electron discharge between cathode 10 and crucible 5 occurs in a region of continuous high vacuum, there is little, if any, tendency for electrical instability due to arcing between the cathode and the crucible. Thus, the current between the cathode and the crucible is essentially electronic, and is space-charge limited as in vacuum-tube diodes.

Metal may be supplied to crucible 5 by any convenient means appropriate to the kind of metal employed. For example, where steel or iron is to be melted and cast, high-quality steel or iron bar stock 17 may be fed continually into the upper portion of the vacuum system through a conventional vacuum seal 18. The lower end of bar 17 extends into the molten metal 19 contained within crucible 5, and there it melts to maintain within the crucible a continual supply of molten metal initially containing a substantial amount of volatile matter.

Since molten metal 19 is exposed to a rough vacuum through the open top of crucible 5, and the upper surface of the molten metal is in contact with the rough vacuum, a major portion of the volatile matter is evolved by the molten metal into the rough vacuum. At the pressure maintained within this portion of the vacuum system, the volume of the released volatile matter is not excessive for economical pumping to maintain the rough vacuum.

In the purification of steel in particular, a refractory crucible is employed, and hydrogen dissolved in the steel combines with oxygen from the refractory crucible, forming water vapor which is evolved into the rough vacuum. Aside from pumping problems, it can be noted that a high vacuum at this stage of the purification would be of no greater worth than a rough vacuum because of continual recontamination of the steel by oxygen from the crucible. In the process according to the present invention, such oxygen is removed in the subsequent high-vacuum stage.

A plurality of heat shields 20, 21 and 22 may be provided above crucible 5, as shown. The uppermost heat shield 22 may advantageously contain passages 22' through which water or other cooling fluid may be circulated. The heat shields provide several advantageous results, including the following: they help to retain heat in the crucible, and thus to reduce the amount of electron bombardment necessary to keep the crucible at the desired temperature; they reduce undesirable heating of other portions of the vacuum system; and they act as a condenser that solidifies condensable portions of the volatile matter released from the molten metal, and thereby reduces the volume of gas that must be removed from the system by vacuum pump 3.

Other heat shields 23, 24, 25, 26 and 27 substantially surround the lower portion of crucible 5, as shown. The outermost shield 27 may advantageously be provided with passages 27' through which water or other cooling fluid may be circulated. In addition to its conventional heat-shielding and condensing functions, the shield structure 23—27 also serves as an electron-focusing electrode, as is hereinafter explained.

Molten metal from crucible 5 flows continually through aperture 6 into the high-vacuum chamber of the vacuum system. Drops 28 of the molten metal fall into a pool of molten metal 29 contained within a "skull" formed at the top of a bar 30 or ingot of the solidified metal. For forming the "skull" of solidified metal, an annular casting mold 31, having an open top end opening into the high-vacuum chamber and disposed vertically below aperture 6 for receiving the metal flowing out of crucible 5, is provided for cooling the circumference of bar 30, so that the molten metal in pool 29 solidifies from the circumference inward, forming a concave depression or "skull" in the solidified metal as indicated by the broken line at the top of bar 30, and a pool of molten metal is retained at the top of rod 30 in a manner analogous to the retention of a pool of molten wax at the top of a candle. Mold 31 is made of a material having a high thermal conductivity, such as copper, and preferably is provided with passages 31' through which water or other cooling fluid may be circulated. Mold 31 is held in place within the vacuum enclosure by any suitable means, such as supporting posts 32 and 33. As metal solidifies at the top of rod 30, the rod may be withdrawn continually from the open bottom end of the mold and removed from the vacuum system through a conventional vacuum seal 34.

Thus metal may be melted, devolatilized and cast in a substantially continuous manner. As bar 17 is lowered, metal, initially containing a substantial amount of volatile matter, is continually supplied to crucible 5 where the metal is melted and continually evolves a portion of its volatile matter into the rough vacuum to maintain a continual supply of partly devolatilized molten metal 19. The partly devolatilized molten metal continually flows or drips through aperture 6 into the pool 29 of molten metal contained in the "skull" at the top of rod 30, and continually evolves a remaining portion of its volatile matter into the high vacuum. Thus, a continual supply of highly devolatilized molten metal is provided at the top of mold 31. As the metal in pool 29 solidifies, rod 30 is continually withdrawn through seal 34 to provide a continual supply of devolatilized cast metal.

As hereinbefore explained, a major portion of the volatile matter is released from the metal while it is in the molten state within crucible 5, and condensable portions of the volatile matter so released solidify on heat shields 20 through 22 while noncondensable portions are pumped out of the system by vacuum pump 3. In other words, a major portion of the volatile matter is efficiently removed from the metal at the relatively high absolute pressures existing in the rough vacuum chamber. However, because of these high pressures, the metal flowing through aperture 6 into the high-vacuum chamber may still contain an appreciable quantity of volatile matter.

In the high vacuum existing below crucible 5, the remaining volatile matter is almost immediately evolved by the molten metal. Condensable portions of this volatile matter may solidify on heat shields 23 through 27, and the remainder is removed from the vacuum system by vacuum pump 4. Since a high vacuum is maintained continuously within the lower vacuum chamber, the cast metal is substantially completely devolatilized.

To insure the production of a sound casting, free of cavities and fissures, the metal at the top of pool 29 must be maintained at a temperature well above the melting point. For this reason, and for further insurance that the cast metal will have been completely devolatilized, heating of the metal in the high-vacuum chamber is essential. Furthermore, the pool of molten metal must be heated directly, without directly heating the copper mold. Therefore, common heating methods, such as resistance heating, induction heating, and the like, are not feasible. The problem is solved by employing electron bombardment heating.

Electron bombardment of the molten metal may be used as a heating means without encountering serious problems of electrical instability or arc formation because this heating occurs in a continuously-maintained high vacuum. Thus, the maintenance of a continuous high vacuum in the lower vacuum chamber makes feasible the use of electron-bombardment heating which solves the problem of directly heating the pool of molten metal without directly heating the mold.

The pool of molten metal 29 is maintained at ground potential through mold 31 and metal portions of the vacuum system that form a closed electrical circuit between the mold and ground, or by any other means. An electron-emitting cathode 35 preferably is of annular form, and advantageously may be a loop of tungsten wire having its ends connected to and supported by leads 36 and 37 which extend through insulators 38 and 39 through a side wall of vacuum system enclosure 1. Leads 36 and 37 are connected to the secondary of a transformer 40 having a primary connected to any suitable source of alternating current for supplying electric current through cathode 35 to heat the same and to produce thermionic emission of electrons. Cathode 35 is maintained at a large negative potential (in the order of several thousand volts) relative to pool 29 by any suitable means, such as an electric generator 41 connected to a center tap on the secondary of transformer 40. Consequently, pool 29 is the anode of a high-vacuum diode, and electrons emitted by cathode 35 are accelerated to high velocities and bombard the pool of molten metal 29 from above for maintaining the metal at the upper surface of the pool at a sufficient temperature, substantially above the melting temperature of the metal, for the casting of a sound ingot.

It is desirable that the electrons emitted by cathode 35 be focused on pool 29 so that substantially all of the electrons emitted will be used to heat the molten metal. Substantial electron bombardment of heat shields 23 through 27 or mold 31 would heat these parts, and therefore is quite undesirable. For focusing the electrons, the heat-shield structure 23 through 27 may be made substantially to surround cathode 35, as shown, with a central aperture in the bottom of the heat-shield structure alined with pool 29. The heat shield structure is supported and insulated from ground by electrical insulators 42 and 43, and it is maintained at the same potential as cathode 35 or at a negative potential with respect to cathode 35 by any suitable means, such as a generator 44 and a lead 45 that extends through an insulator 46 through a side wall of vacuum enclosure 1. The negative potential of the heat shield structure repels the electrons emitted by cathode 35 and effectively focuses the electrons on the pool 29 of molten metal.

Alternatively, but less desirably, instead of providing separate voltage supply means for maintaining heat shields 23 through 27 negative with respect to cathode 35, the heat shields may simply be electrically insulated from ground and other parts of the apparatus. Electrons may then flow to the heat shields until the accumulated charge provides a sufficiently negative potential to stop such flow.

Focusing the electrons onto pool 29 is also aided by the vapors emanating from the pool of molten metal, which provide a relatively low-resistance region immediately above pool 29, by providing positive ions that partly neutralize the electronic space charge in the terminal portion only of the electron flow. This low-resistance region helps to direct the electron flow toward pool 29 and away from mold 31 and other parts of the apparatus. However, it should be kept in mind that a high vacuum, at an absolute pressure less than one micron of mercury, is continuously maintained in the lower vacuum chamber. Therefore, the electric current between cathode 35 and pool 29 is essentially a high-voltage space-charge limited electron flow, such as occurs in a "hard" vacuum tube, and heat is produced by the high-velocity electron bombardment of pool 29. The ionic current is negligible, and appreciable space-charge neutralization occurs only in a small region immediately above pool 29. A glow discharge, such as would prevail at rough-vacuum pressures, would not be suitable for several reasons, including the fact that the heat released by a glow discharge could not be adequately concentrated on pool 29, and the fact that much greater currents would be required for a given heating rate, as well as control and stability difficulties.

If the initial content of volatile matter in the metal is exceptionally high, as in the case of ordinary commercial steel, it might be more economical to perform the out-gassing of the metal in three stages rather than two. This can be accomplished, for example, by providing still another vacuum chamber above the upper chamber shown in FIG. 2, and maintaining progressively higher degrees of vacuum in the three chambers. In this case the absolute pressure in a first or uppermost chamber is preferably in the order of several millimeters of mercury (a low vacuum), the absolute pressure in the intermediate vacuum chamber is somewhat less than one millimeter of mercury (a rough vacuum as herein defined), and the absolute pressure in the final or lowest vacuum chamber is less than one micron of mercury (a high vacuum). The metal is first melted in the lowest-vacuum (highest-pressure) chamber for preliminary out-gassing and then is continually transferred by any suitable means to crucible 5 in the intermediate or rough-vacuum chamber for further out-gassing. Final devolatilization and casting of the metal in the high-vacuum chamber proceeds as hereinbefore described.

However, rather than provide a three-stage vacuum devolatilization process, it is usually more economical to use a two-stage arrangement as illustrated in FIG. 2, and to use for the bar stock 17 high-quality alloy steel, which is usually carefully de-gassed as much as is possible during atmospheric operations, so that the quantity of volatile material released in the rough-vacuum portion of the system will not exceed the pumping capabilities of vacuum pump 3.

It should also be appreciated that shapes other than bars or ingots can be cast with minor modifications of the apparatus illustrated. For example, in the casting of metals that are reasonably inert chemically, such as steel, instead of containing the pool of molten metal 29 within a "skull" at the top of a bar 30, pool 29 may be contained in a holding crucible or ladle from which it can be supplied in vacuo to casting molds of any desired size and shape. In this case, the metal can be kept molten by heating the holding crucible, instead of by direct electron bombardment of the molten metal.

Various other means for feeding metal into crucible 5 may be employed in place of the solid bar stock 17. For example, the metal may be melted initially outside of the vacuum system and transferred to the crucible in a molten state, as by melting the metal in another crucible disposed above the upper vacuum chamber and causing the molten metal continually to drip into the open top of crucible 5, in a manner analogous to the flow of molten metal from crucible 5 into mold 31. Even in this case, heat preferably is supplied to the metal within crucible 5 to keep it molten, either by heating the crucible, as hereinbefore explained, or by heating the metal directly, by electron bombardment or other means. Alternatively, lumps of unmolten metal may be fed continually into crucible 5 by any appropriate feed mechanism.

Where the metal being processed has an intense chemical activity when molten, as in the case of titanium, contact between the molten metal and the crucible should be kept to a minimum. Otherwise, the crucible will rapidly be destroyed and the metal will be contaminated by chemical action between the molten metal and the crucible. This problem is solved by feeding lumps of unmolten metal into the crucible, continually melting the metal within the crucible, and permitting the molten metal to flow out of the crucible almost immediately as the metal melts.

Figure 3:
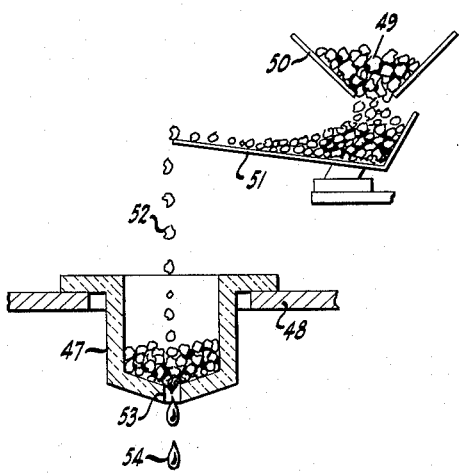
FIG. 3 is a fragmentary vertical section of other apparatus that may be used in practicing the invention.

FIG. 3 of the drawings is a fragmentary view showing how the apparatus can be adapted for handling metals such as titanium that are extremely active chemically when in the molten state. A small open-topped crucible 47 extends through and is supported by a horizontal partition 48 within a vacuum system. Suitable means, not shown in FIG. 3, are provided for continuously maintaining a rough vacuum within crucible 47 and a high vacuum below crucible 47, in the manner hereinbefore explained. Heat shields, heating means, and an annular casting mold are also provided. For clarity, these parts have been omitted from FIG. 3, since they may be substantially like the corresponding parts illustrated in FIG. 2. Sufficient heat is supplied to crucible 47, preferably by high-velocity electron bombardment, to heat metal within the crucible to the melting temperature of titanium.

A supply of lumps 49 of titanium sponge is held in a hopper 50 disposed within the vacuum system. Such sponge is the usual form of titanium produced by chemical purification processes, and may initially contain about three-tenths to six-tenths of one percent, by weight, of magnesium or sodium chloride, and a small amount of water absorbed by the chloride impurities. Both the chlorides and the water are undesirable volatile matter. For the fabrication of titanium parts by subsequent metal working operations, sound cast ingots of devolatilized titanium are required. Such ingots may advantageously be made by a vacuum devolatilization and casting process incorporating principles of the present invention.

Any appropriate type of feed mechanism 51 is employed to withdraw lumps of titanium sponge from hopper 50 and feed such lumps continually into the open top of crucible 47, as is indicated in the drawing by the lump 52 of titanium sponge that is falling from the end of the feed mechanism into the crucible. Thus, a small supply of unmelted titanium sponge is maintained within crucible 47. Hopper 50 may be refilled from time to time with additional titanium sponge fed into the vacuum system through a conventional air lock, not shown.

The heat supplied to crucible 47 continually melts titanium sponge within the crucible. The melting titanium continually evolves a major portion of its volatile matter into the rough vacuum, and provides within crucible 47 a continual supply of partly devolatilized molten titanium. The volatile matter so evolved is condensed on the heat shields and other relatively cool parts of the system, or is pumped out of the vacuum system, or both.

A small aperture 53 is provided in the bottom of crucible 47, as shown. For example, crucible 47 may have an inside diameter of one and one-half inches, and aperture 53 may be a one-eighth inch diameter hole. Because the aperture is small, very little of the volatile matter evolved within crucible 47 passes through aperture 53 into the high vacuum below the crucible.

Promptly after melting, the partly devolatilized molten titanium flows out of crucible 47 through aperture 53 into the high vacuum below the crucible. A drop of molten titanium falling from the crucible is indicated in the drawing at 54. Because each bit of molten titanium remains within crucible 47 for only a very short time after the titanium melts, chemical action between the molten titanium and the crucible is kept to a minimum. Furthermore, because of the continuous nature of the melting and casting process made possible by this invention, crucible 47 can be quite small compared to the quantity of titanium handled over a period of time. Consequently, it is economical to use expensive crucible materials, such as cerium sulphide, that are relatively resistant to chemical attack by molten titanium. Therefore, this invention makes large-scale crucible melting of titanium and the like economically feasible for the first time.

The partly devolatilized molten titanium continually flowing out of crucible 47 through aperture 53 continually evolves a remaining portion of this volatile matter into the high vacuum that is continuously maintained below the crucible. Thus, a continual supply of highly devolatilized titanium is provided. If desired, this highly devolatilized titanium can be vacuum cast into rods or ingots in an annular mold like the mold illustrated in FIG. 2. Alternatively, the drops 54 of highly devolatilized titanium can be permitted to lose sufficient heat by radiation to solidify while falling through a high vacuum chamber. In this way pellets of highly devolatilized titanium can be produced. The devolatilized pellets can be removed from the vacuum system through a conventional air lock.

It should be understood that this invention in its broader aspects is not limited to specific examples herein illustrated and described. The following claims are intended to cover all changes and modifications within the true spirit and scope of the invention.

What is claimed is:

1. A continuous process for making devolatilized metal castings within vacuum apparatus including a crucible and a vacuum chamber, said crucible being provided with an aperture opening into said vacuum chamber for withdrawing molten metal from the crucible, comprising the following contemporaneous steps: maintaining a partial vacuum within said crucible at an absolute pressure between ten microns and one millimeter of mercury; continually feeding into said crucible metal initially containing a substantial amount of volatile matter; continually heating said metal within said crucible to the melting temperature of said metal, so that said metal continually evolves a portion of said volatile matter into said partial vacuum to produce partly devolatilized molten metal continually within said crucible; maintaining within said vacuum chamber a high vacuum at an absolute pressure of less than one micron of mercury; continually transferring said partly devolatilized molten metal through said aperture into an open-topped mold disposed directly below said aperture and within said vacuum chamber; supplying additional heat to said metal within said vacuum chamber by direct electron bombardment of the upper surface of molten metal within said mold, so that said metal continually evolves a remaining portion of said volatile matter into said higher vacuum to produce more highly devolatilized molten metal continually within said vacuum chamber; and vacuum casting said more highly devolatilized metal to produce devolatilized metal castings.

2. A continuous process for casting devolatilized metal rods within vacuum apparatus including a crucible, a vacuum chamber, and an annular mold having open top and bottom ends, said crucible being provided with an aperture opening into said vacuum chamber for withdrawing molten metal from the crucible, the top end of said mold opening into said vacuum chamber and being disposed vertically below said aperture for receiving the molten metal withdrawn from said crucible, comprising the following contemporaneous steps: maintaining a rough vacuum within said crucible; providing within said crucible a continual supply of molten metal initially containing a substantial amount of volatile matter, so that said metal continually evolves a portion of said volatile matter into said rough vacuum to produce a continual supply of partly devolatilized molten metal; maintaining a high vacuum within said vacuum chamber; causing said partly devolatilized molten metal to flow continually through said aperture into the open top end of said mold, so that said metal continually evolves a remaining portion of said volatile matter into said high vacuum to produce a continual supply of highly devolatilized metal within said mold; continually bombarding from above with electrons the upper surface of molten metal within said mold to maintain a molten pool of said metal at the top end of said mold; continually cooling said mold to solidify said highly devolatilized metal within the mold into a rod having a top end with a concave depression supporting said molten pool; and continually withdrawing said rod through the bottom end of said mold.

3. A continuous process for devolatilizing an active metal within apparatus including an upper vacuum chamber, a lower vacuum chamber, and a crucible having an open top for receiving unmolten metal and an aperture for discharging molten metal, said top opening into said upper vacuum chamber and said aperture opening into said lower vacuum chamber, comprising the following contemporaneous steps: maintaining a rough vacuum within said upper vacuum chamber at an absolute pressure between ten microns and one millimeter of mercury; continually feeding into the top of said crucible a rod of unmolten metal containing substantial amounts of volatile matter; continually heating said crucible to melt said rod continually as it is fed into said crucible and maintaining a continual supply of said metal in a molten state within said crucible, so that said metal in a molten state continually evolves a portion of said volatile matter into said rough vacuum to produce a continual supply of partly devolatilized molten metal; maintaining a high vacuum within said lower vacuum chamber at an absolute pressure of less than one micron of mercury; causing said partly devolatilized molten metal to flow continually through said aperture into an open-topped continuous casting mold disposed directly below said aperture and within said lower vacuum chamber; and continually supplying additional heat to said metal within said lower vacuum chamber by direct electron bombardment of the upper surface of molten metal within said mold, so that said metal continually evolves a remaining portion of said volatile matter into said high vacuum to produce a continual supply of highly devolatilized metal.

4. A continuous process for devolatilizing an active metal within apparatus including an upper vacuum chamber, a lower vacuum chamber, a crucible having an open top and having a bottom containing an aperture, said top opening into said upper vacuum chamber and said aperture opening into said lower vacuum chamber, comprising the following contemporaneous steps: maintaining a rough vacuum within said upper vacuum chamber and said crucible at an absolute pressure between ten microns and one millimeter of mercury; continually feeding into the top of said crucible lumps of unmolten metal containing substantial amounts of volatile matter; continually heating said crucible to melt said metal continually within said crucible, so that said metal continually evolves a portion of said volatile matter into said rough vacuum to produce a continual supply of devolatilized molten metal within said crucible; causing said devolatilized molten metal to flow continually from said crucible through said aperture into an open-topped mold disposed directly below said aperture and within said lower vacuum chamber promptly upon the melting of said metal; maintaining a high vacuum within said lower vacuum chamber; at an absolute pressure of less than one micron of mercury and continually supplying additional heat to said metal within said lower vacuum chamber by direct electron bombardment of the upper surface of molten metal within said mold, so that said metal continually evolves a remaining portion of said volatile matter into said high vacuum to produce a continual supply of highly devolatilized metal.

References Cited in the file of this patent

UNITED STATES PATENTS

| 2,423,729 | Ruhle | July 8, 1947 |
| 2,554,902 | Godley | May 29, 1951 |
| 2,625,719 | Moore | Jan. 20, 1953 |
| 2,688,169 | Gruber | Sept. 7, 1954 |
| 2,709,842 | Findlay | June 7, 1955 |
| 2,771,568 | Steigerwald | Nov. 20, 1956 |
| 2,778,926 | Schneider | Jan. 22, 1957 |
| 2,804,664 | Brennan | Sept. 3, 1957 |
| 2,858,199 | Larson | Oct. 28, 1958 |
| 2,880,483 | Hanks et al. | Apr. 7, 1959 |
| 2,882,570 | Brennan | Apr. 21, 1959 |

FOREIGN PATENTS

| 413,743 | Great Britain | July 19, 1934 |
| 735,642 | Great Britain | Aug. 24, 1955 |